US012756141B2

(12) United States Patent
Kang et al.

(10) Patent No.: US 12,756,141 B2
(45) Date of Patent: Oct. 6, 2026

(54) CONNECTOR LOCKING DEVICE

(71) Applicants: Hyundai Motor Company, Seoul (KR); Kia Corporation, Seoul (KR); KUM CO., LTD., Ulsan (KR)

(72) Inventors: Minseok Kang, Suwon-Si (KR); Seungmyeon Bae, Hwaseong-Si (KR); Hyeongrak Kim, Ulsan (KR); Dongwook Kim, Ulsan (KR)

(73) Assignees: Hyundai Motor Company, Seoul (KR); Kia Corporation, Seoul (KR); KUM CO., LTD., Ulsan (KR)

( * ) Notice: Subject to any disclaimer, the term of this patent is extended or adjusted under 35 U.S.C. 154(b) by 343 days.

(21) Appl. No.: 18/633,251

(22) Filed: Apr. 11, 2024

(65) Prior Publication Data

US 2024/0347974 A1 Oct. 17, 2024

(30) Foreign Application Priority Data

Apr. 14, 2023 (KR) ........................ 10-2023-0049085

(51) Int. Cl.

*H01R 13/642* (2006.01)
*H01R 13/629* (2006.01)
*H01R 13/639* (2006.01)
*H01R 13/62* (2006.01)
*H01R 13/64* (2006.01)
*H01R 13/641* (2006.01)

(52) U.S. Cl.

CPC ......... *H01R 13/642* (2013.01); *H01R 13/629* (2013.01); *H01R 13/62911* (2013.01); *H01R 13/639* (2013.01); *H01R 13/62* (2013.01); *H01R 13/62927* (2013.01); *H01R 13/64* (2013.01); *H01R 13/641* (2013.01)

(58) Field of Classification Search

CPC ................ H01R 13/642; H01R 13/629; H01R 13/62911; H01R 13/639; H01R 13/62; H01R 13/62927; H01R 13/64; H01R 13/641

See application file for complete search history.

(56) References Cited

U.S. PATENT DOCUMENTS 7,470,138 B1 * 12/2008 Chen .................... H01R 13/506 439/352
2024/0275106 A1 * 8/2024 Buck ................ H01R 13/62933

* cited by examiner

*Primary Examiner* — Justin M Kratt
(74) *Attorney, Agent, or Firm* — Banner & Witcoff, Ltd.

(57) ABSTRACT

A connector locking device includes a first connector, a second connector coupled to the first connector and including a guide hole having a locking protrusion and a locking groove on an outer side thereof, a connector position assurance (CPA) member fastened to the locking groove while moving along the guide hole and preventing the first connector and the second connector from being decoupled, and a slider mounted on the second connector to advance or retract in a direction intersecting a fastening direction of the first connector and the second connector, the slider including a mating guide protrusion, wherein the CPA member includes a mating guide groove to allow the mating guide protrusion to be inserted and movable therein, and the CPA member is guided to advance or retract in a direction intersecting the advancement or retraction of the slider.

9 Claims, 6 Drawing Sheets

CONNECTOR LOCKING DEVICE

CROSS-REFERENCE TO RELATED APPLICATION(S)

This application claims the benefit of Korean Patent Application No. 10-2023-0049085, filed on Apr. 14, 2023, which application is hereby incorporated herein by reference.

TECHNICAL FIELD

The present disclosure relates to a connector locking device, and more particularly, to a connector locking device capable of allowing a first connector and a second connector to maintain a stable connection after being coupled to each other.

BACKGROUND

A connector includes a device that connects or disconnects power or electrical signal wires. A connector may allow wires to be connected or disconnected by coupling or decoupling a first connector and a second connector that are configured to be connected to each other. As a result, various electrical components may be easily assembled, and in the event of repair, only the damaged parts may be easily removed and replaced when repairing one or more parts.

SUMMARY

The present disclosure provides a connector locking device capable of fastening completely a CPA member.

In an example, a vehicle door includes a large number of wires for the operation of power windows, door locks, side mirrors, speakers, and various control switches. Thus, when the vehicle door is mounted on a vehicle body, a connector is used to connect the door-side wires to the vehicle body-side wires.

Such a connector is additionally provided with a fastener for continuously maintaining an electrical connection in a state where the first connector and the second connector are coupled to each other. The fastener (hereinafter may be referred to as a connector position assurance (CPA) member) is provided to be fastened in the same direction as a fastening direction of the connectors when the first connector and the second connector are coupled to each other in a straight line.

However, in the case of a narrow working environment for coupling the connectors, it may be difficult for the CPA member to be fastened, resulting in a decrease in workability.

In addition, when the connector is bent into a 90° shape rather than a 180° shape that allows the connector to be assembled in a straight line, it may be unavailable to visually check a fastened status of the CPA member. In other words, the CPA member is often not completely coupled, and thus the workability during assembly and disassembly is reduced because it is not easy to visually check.

The present disclosure provides a connector locking device capable of improving fastening workability by fastening a CPA member by a slider regardless of whether the CPA member is visible.

Further, the present disclosure provides a connector locking device capable of checking a fastened state of a CPA member by a slider and being easily unfastened upon release.

Additional features will be set forth in part in the description which follows and, in part, will be obvious from the description, or may be learned by practice of the disclosure.

In accordance with one or more aspects of the disclosure, a connector locking device includes a first connector; a second connector coupled to the first connector, wherein the second connector comprises a guide hole having a locking protrusion and a locking groove on an outer side of the guide hole; a connector position assurance (CPA) member configured to be fastened to the locking groove while moving along the guide hole and configured to prevent the first connector and the second connector from being decoupled; and a slider mounted on the second connector to advance or retract in a direction intersecting a fastening direction of the first connector and the second connector, wherein the slider comprises a mating guide protrusion, wherein the CPA member comprises a mating guide groove configured to accommodate the mating guide protrusion such that the mating guide protrusion is inserted and movable in the mating guide groove, and the CPA member is configured to be guided to advance or retract in a direction intersecting the advancement or retraction of the slider.

The CPA member may include: a body portion inserted into the guide hole to be movable, a locking protrusion protruding from the body portion and provided to be elastically deformable, and the mating guide groove formed in the body portion.

The mating guide groove may include an inclined guide portion configured to guide the mating guide protrusion to allow the CPA member to enter the guide hole when the slider is fastened.

The slider may be configured to be movable in a direction intersecting a moving direction of the CPA member, and the slider may further include: a pair of side plates, wherein the mating guide protrusion inserted into the mating guide groove is provided on inner surfaces of the pair of side plates, and a connection plate connecting the pair of side plates.

The connection plate may include a first gripping portion protruding outwardly. At least one of the pair of side plates may include a second gripping portion recessed inwardly.

The second connector may include a guide groove formed along a moving direction of the slider, and the slider may include an inner guide protrusion inserted into the guide groove.

The second connector may include a guide rail that supports and guides an end portion of the side plates. The second connector may include a stopper that prevents the slider from deviating and limits a movement distance.

In accordance with one or more aspects of the disclosure, a connector locking device includes a first connector, a second connector coupled to the first connector and including a guide hole having a locking protrusion and a locking groove on an outer side thereof, a connector position assurance (CPA) member fastened to the locking groove while moving along the guide hole and preventing the first connector and the second connector from being decoupled, and a slider mounted on the second connector to advance or retract in a direction intersecting a fastening direction of the first connector and the second connector, the slider including a mating guide protrusion, wherein the CPA member includes a mating guide groove to allow the mating guide protrusion to be inserted and movable therein, and the CPA member is guided to advance or retract in a direction intersecting the advancement or retraction of the slider.

The CPA member may include a body portion inserted into the guide hole to be movable, a locking protrusion protruding from the body portion and provided to be elastically deformable, and a mating guide groove formed in the body portion.

The mating guide groove may include an inclined guide portion guiding the mating guide protrusion to allow the CPA member to enter the guide hole when the slider is fastened.

The slider may be movable in a direction intersecting a moving direction of the CPA member, and the slider may further include a pair of side plates each provided on an inner surface thereof and including the mating guide protrusion inserted into the mating guide groove, and a connection plate connecting the pair of side plates.

The connection plate may include a first gripping portion protruding outwardly.

At least one of the pair of side plates may include a second gripping portion recessed inwardly.

The second connector may include a guide groove formed along a moving direction of the slider, and the slider may include an inner guide protrusion inserted into the guide groove.

The second connector may include a guide rail that supports and guides an end portion of the side plate.

The second connector may include a stopper that prevents the slider from deviating and limits a movement distance.

BRIEF DESCRIPTION OF THE DRAWINGS

These and/or other aspects of the disclosure will become apparent and more readily appreciated from the following description, taken in conjunction with the accompanying drawings, in which.

DETAILED DESCRIPTION

Figure 1:
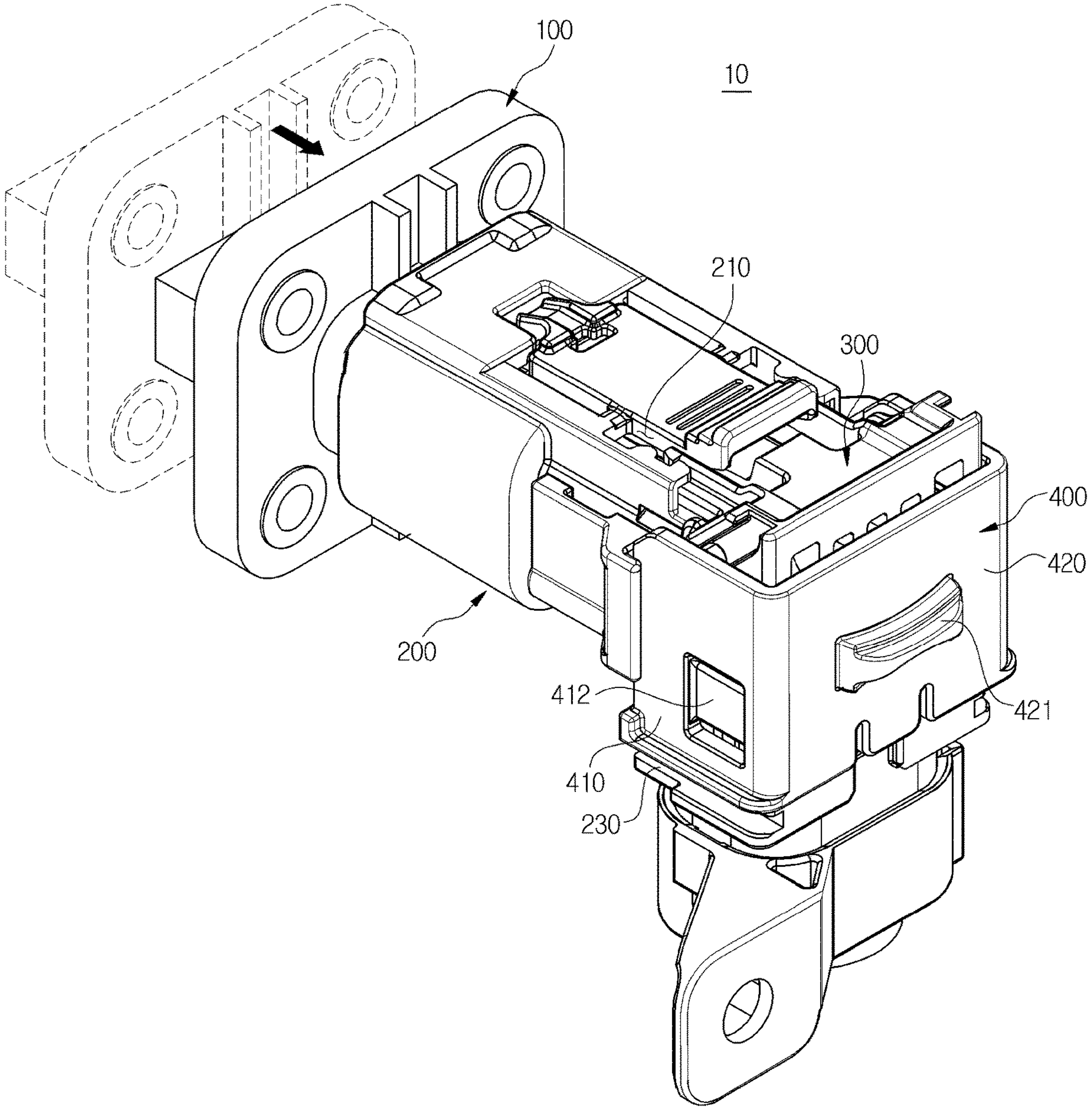
FIG. 1 is a perspective view illustrating a connector locking device according to an example of the present disclosure.

Reference will now be made in detail to various examples of the disclosure. Examples of the disclosure are illustrated in the accompanying drawings, wherein like reference numerals refer to like elements throughout. This specification may not describe all elements of the disclosed embodiment(s) and detailed descriptions of what is well known in the art or redundant descriptions of substantially the same configurations may be omitted. The terms 'part', 'module', 'member', 'block' and the like as used in the specification may be implemented via software and/or hardware. Further, a plurality of 'part', 'module', 'member', 'block' and the like may be embodied as one component. It is also possible that one 'part', 'module', 'member', 'block' and the like includes a plurality of components.

Throughout the specification, when an element is referred to as being "connected to" another element, it may be directly or indirectly connected to the other element, where "indirectly connected to" includes being connected to the other element via another element and/or a wireless communication link and/or network.

Also, it is to be understood that the terms "comprise", "include" and "have" are intended to indicate the existence of elements disclosed in the specification, and are not intended to preclude the possibility that one or more other elements may exist or may be added.

Throughout the specification, when a member is located "on" another member, this includes not only when one member is in contact with another member but also when another member is present between the two members.

The terms "first", "second", and the like are used to distinguish one component from another component, and the component is not limited by such terms.

An expression used in the singular encompasses the expression of the plural, unless it has a clearly different meaning in the context.

The reference numerals used in operations are used for descriptive convenience and are not intended to describe the order of operations. The operations may be performed in a different order unless otherwise stated.

Hereinafter, operating principle and various features of the present disclosure will be described with reference to the accompanying drawings.

Figure 2:
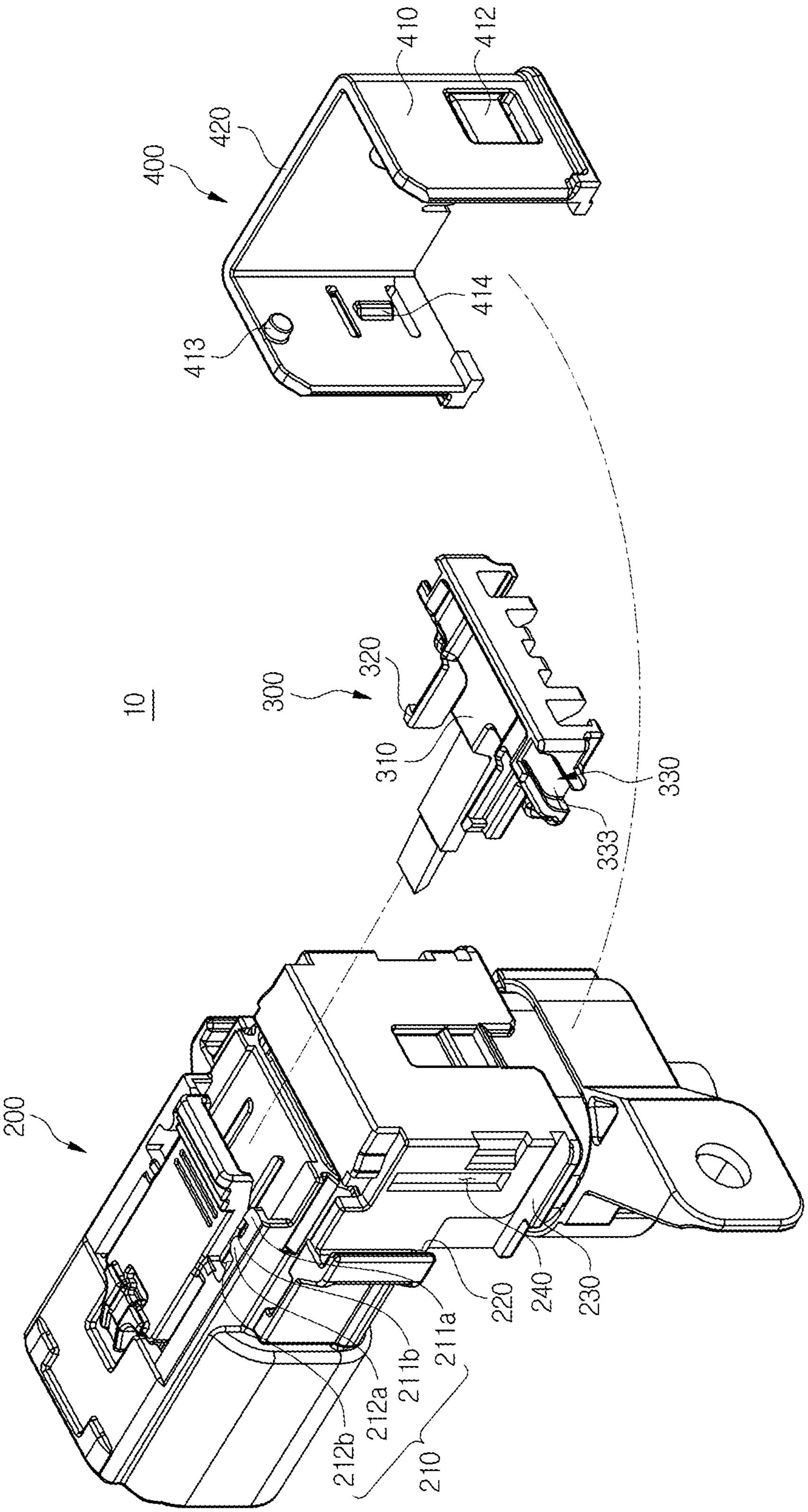
FIG. 2 is an exploded perspective view illustrating the connector locking device according to an example of the present disclosure.
Figure 3:
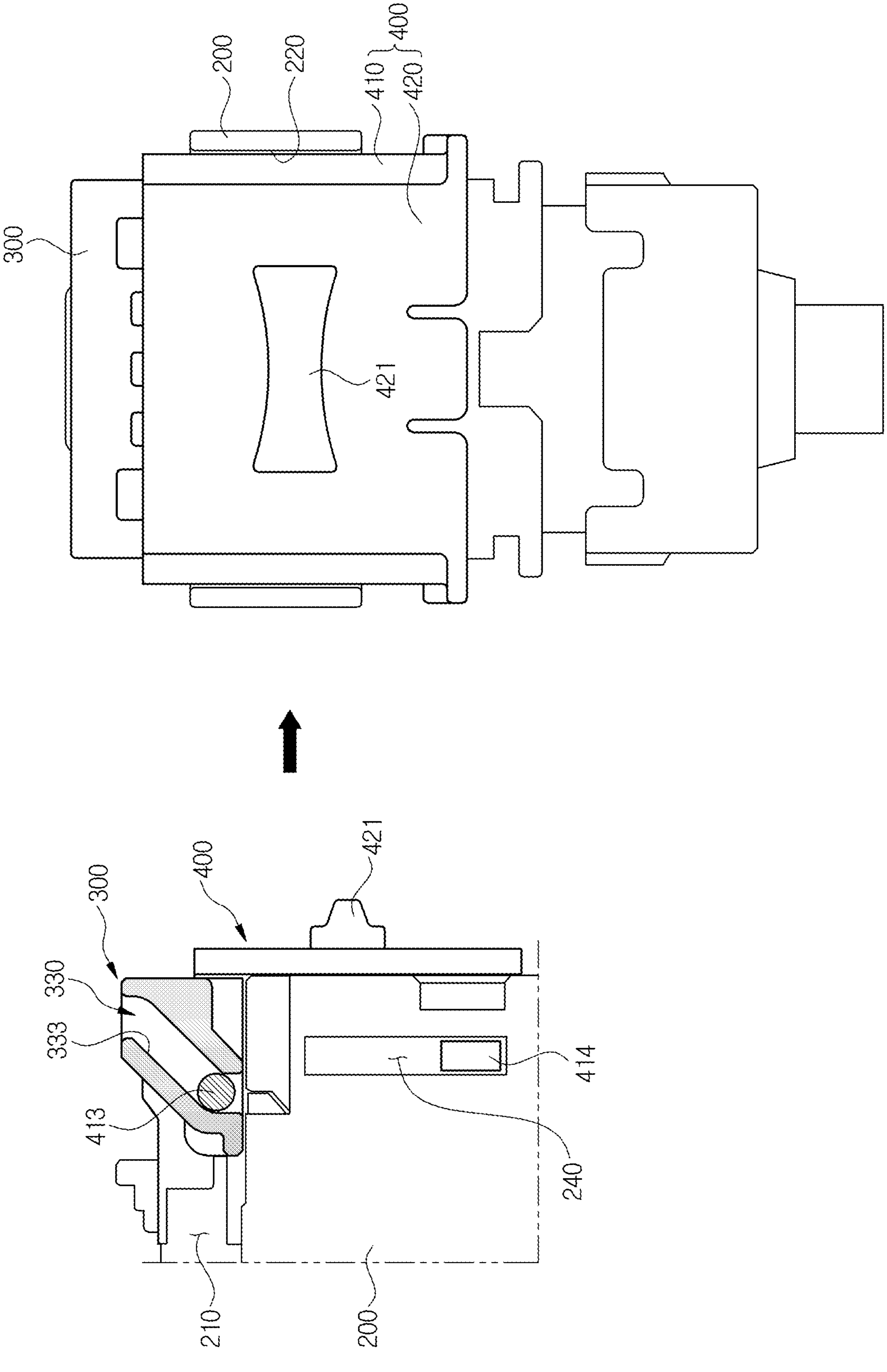
FIG. 3 is a view illustrating a pre-operational state of the connector locking device according to an example of the present disclosure.
Figure 4:
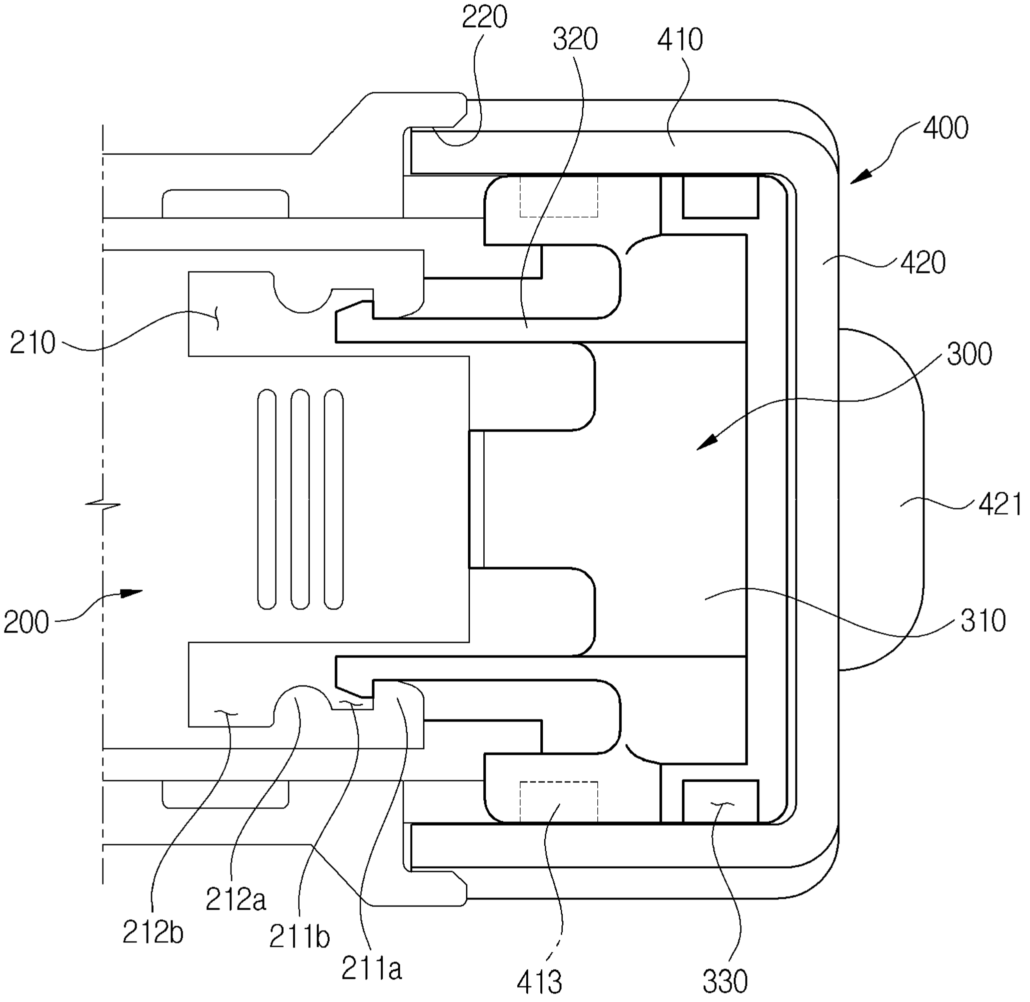
FIG. 4 is a plan view illustrating an unfastened state of a CPA member of the connector locking device according to an example of the present disclosure.
Figure 5:
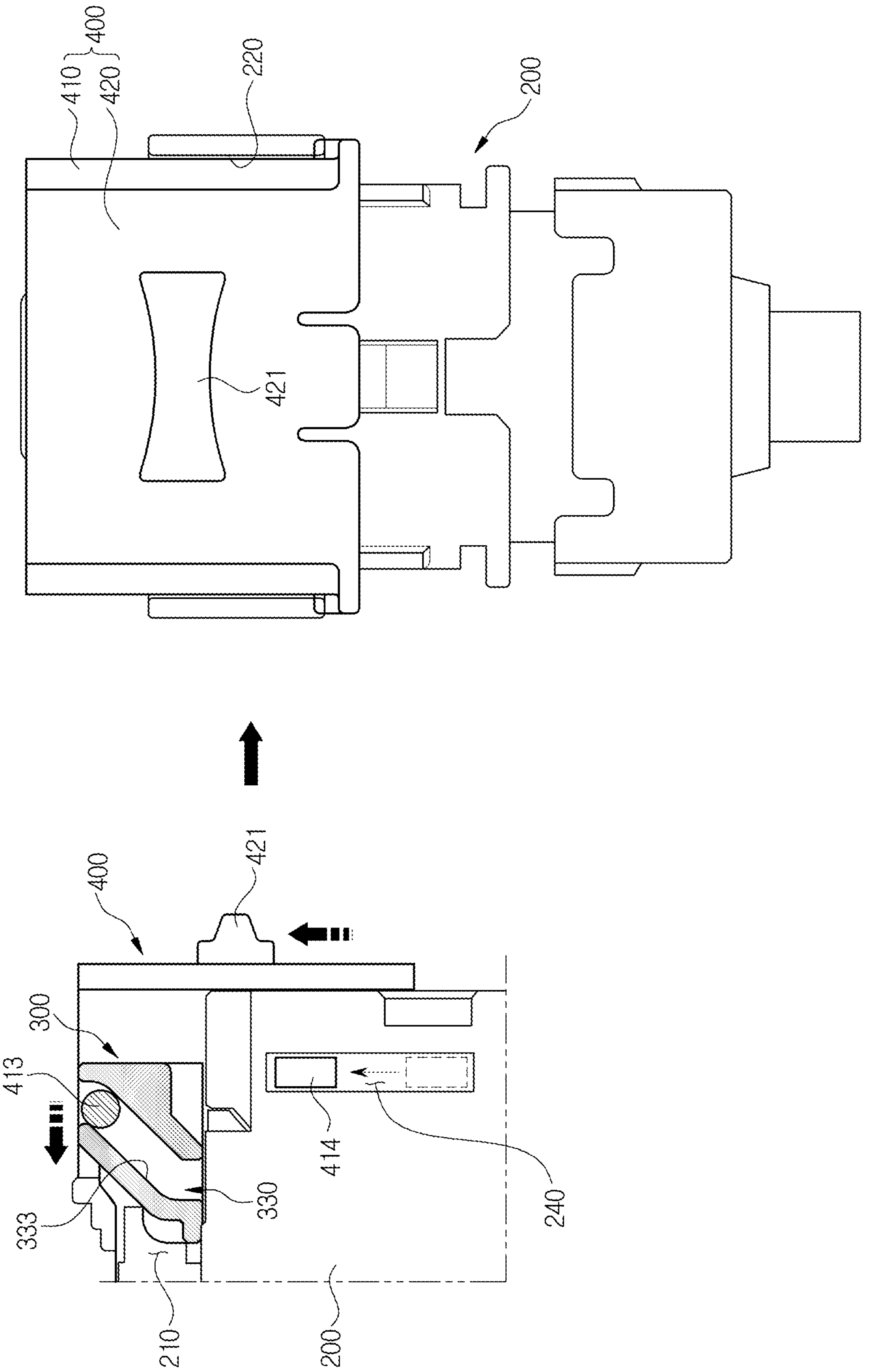
FIG. 5 is a view illustrating an operational state of the connector locking device according to an example of the present disclosure.
Figure 6:
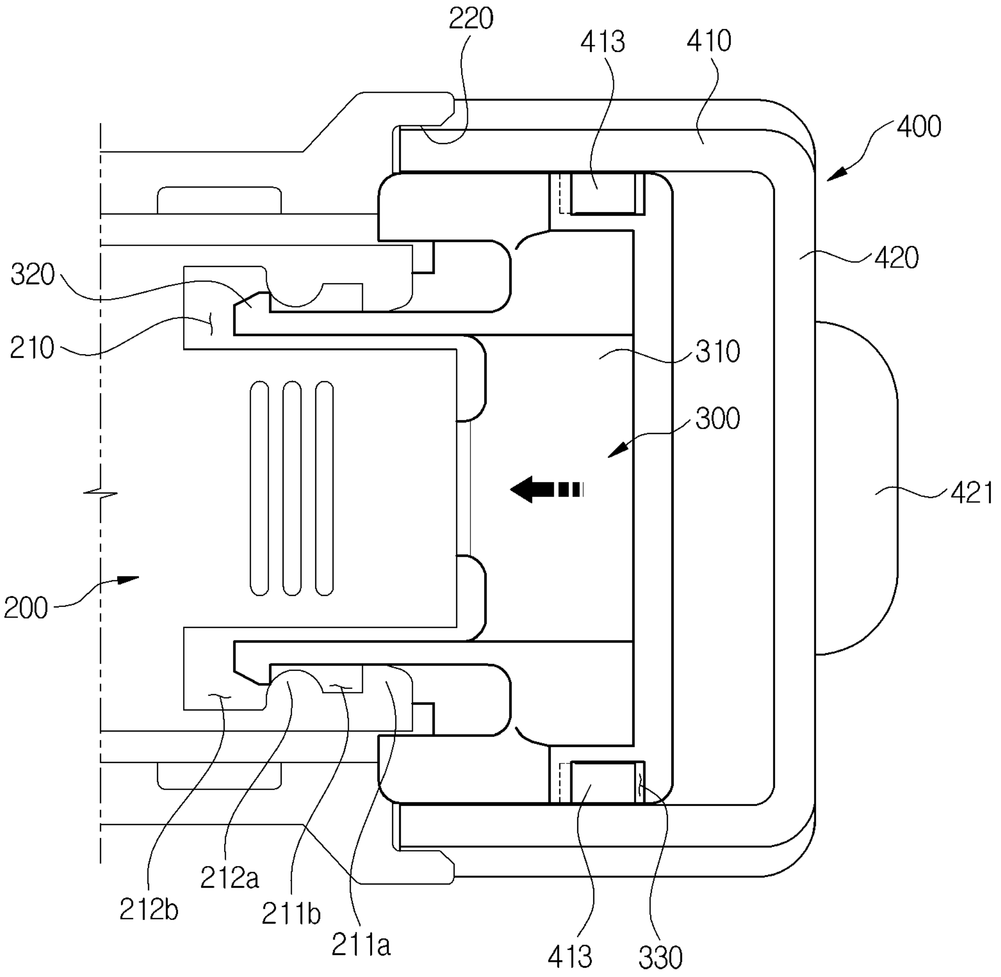
FIG. 6 is a perspective view illustrating a fastened state of the CPA member of the connector locking device according to an example of the present disclosure.

FIG. 1 is a perspective view illustrating a connector locking device according to an example of the present disclosure, FIG. 2 is an exploded perspective view illustrating the connector locking device according to an example of the present disclosure, FIG. 3 is a view illustrating a pre-operational state of the connector locking device according to an example of the present disclosure, FIG. 4 is a plan view illustrating an unfastened state of a CPA member of the connector locking device according to an example of the present disclosure, FIG. 5 is a view illustrating an operational state of the connector locking device according to an example of the present disclosure, and FIG. 6 is a perspective view illustrating a fastened state of the CPA member of the connector locking device according to an example of the present disclosure.

Referring to FIGS. 1 to 6, the present disclosure is directed to a connector locking device 10 provided on a second connector 200, which is configured to be coupled to a first connector 100. The connector locking device 10 provided on the second connector 200 is configured to mutually lock the first and second connectors 100 and 200. The connector locking device 10 may include a connector, a connector position assurance (CPA) member 300, and a slider 400.

The connector may include the first connector 100 and/or the second connector 200, which are configured to mutually be coupled/connected to connect wires (not shown) or to be mutually decoupled/disconnected to separate wires.

The first and second connectors 100 and 200 may be a male connector and a female connector (or vice versa) configured to be coupled to each other correspondingly, and may have wires (not shown) connected to each side. Such connectors may be used to connect wires on a body side of a vehicle and wires on a door side, but are not limited thereto.

The second connector 200 may be provided to have a shape bent at 90° (e.g., an inverted L-shaped bent shape). Although the second connector 200 is provided to have a bent shape, a structure in which a connecting portion (not shown) of the first connector 100 enters into the inside of the second connector 200 and is fastened thereto may be similar to a structure of a 180°-shaped connector (e.g., including a conventional 180°-shaped connector). If the first connector 100 and the second connector 200 are coupled, the slider 400 may allow a fastened state to be maintained by the CPA member 300. The CPA member 300 and the slider 400 operating the CPA member will be described below.

A guide hole 210 to which the CPA member 300 is configured to be fastened may be provided on an outer side of the second connector 200. The guide hole 210 may be formed in the same fastening direction as a direction in which the first and second connectors 100 and 200 are configured to be coupled. Locking protrusions 211*a* and 212*a* and locking grooves 211*b* and 212*b* may be formed sequentially and repeatedly on both sides of the guide hole 210. For example, two or more locking protrusions 211*a* and 212*a*, etc. and two or more locking grooves 211*b* and 212*b*, etc. may be provided. In other words, the first locking protrusion 211*a* and the first locking groove 211*b* may be formed from an outer side of the guide hole 210, and the second locking protrusion 212*a* and the second locking groove 212*b* may be formed as a repetition of the first locking protrusion 211*a* and the first locking groove 211*b*. The two locking protrusions 211*a* and 212*a* and the two locking grooves 211*b* and 212*b* may be provided to allow the fastened state of the CPA member 300 to remain fastened, as will be described later. The fastened state according to the operation of the CPA member 300 will be described below.

Also, or alternatively, the second connector 200 may be provided with a guide rail 220 configured to support and/or guide the slider 400, and/or a stopper 230 configured to prevent the slider 400 from deviating from a pre-operational state and/or an original (e.g., operational) state and limits a movement distance of the slider 400. The guide rail 220 may be formed along a direction in which the slider 400 is configured to move. The stopper 230 may be configured to prevent the slider 400 from deviating outwardly from its pre-operational state, and also support the slider 400 as it returns to its original (e.g., operational) state, for example, upon release of the slider 400. As such, the stopper 230 may be configured to prevent deviation of the slider 400 from prescribed positions associated with an operational or pre-operational state, even under excessive pressure.

The CPA member 300 may be provided to be slidable in the same direction as the fastening (or coupling) direction of the first connector 100 and the second connector 200. The CPA member 300 may be slidably fastened to the second connector 200. The CPA member 300 may be a member configured to assist in maintaining and/or maintain the electrical connection between the first connector 100 and the second connector 200, for example, by tightening the coupling therebetween. The CPA member 300 may be a configured to prevent the terminals configured to transmit current between the first connector 100 and the second connector 200 from being disconnected, and be also referred to as a double lock (DBL). Consequently, this may prevent the connector from being disconnected by any external force. The CPA member 300 may be assembled by sliding in the guide hole 210.

The CPA member 300 may include a body portion 310, a locking protrusion 320, and a mating guide groove 330.

The body portion 310 may be configured to be inserted into the guide hole 210, so as to be movable.

The locking protrusion 320 may be configured to protrude from the body portion 310 toward the guide hole 210. The locking protrusion may be elastically deformable. Accordingly, the locking protrusion 320 may be first elastically deformed inwardly by the first locking protrusion 211*a* formed in the guide hole 210, and be elastically restored (e.g., at least partially) when positioned in the first locking groove 211*b*, e.g., restored to be inserted into the first locking groove 211*b*. Furthermore, when the CPA member 300 is actuated and moved in the fastening direction, the locking protrusion 320 may be elastically deformed inwardly by the second locking protrusion 212*a*, and may be elastically restored (e.g., at least partially) when positioned in the second locking groove 212*b*, e.g., restored to be inserted into the second locking groove 212*b*. Accordingly, the movement of the CPA member 300 may be restricted by the locking protrusion 320 to maintain a locked state thereof.

The mating guide groove 330 may be formed on the sides of the body portion 310. The mating guide groove 330 may be configured to guide a mating guide protrusion 413 of the slider 400 to guide the advancement and retraction of the CPA member 300. Accordingly, the mating guide groove 330 may include an inclined guide portion 333 configured to guide the mating guide protrusion 413.

The inclined guide portion 333 may be formed to be inclined toward an upper rearward direction (e.g., relative to a frontward direction of the second connector 200 toward the first connector 100 when being connected), as shown. Accordingly, when the slider 400 moves from a lower side to an upper side, the CPA member 300 may move to the left with respect to FIG. 5. In other words, the CPA member 300 may advance inwardly into the guide hole 210.

The slider 400 may be mounted on an outer surface of the second connector 200 to be movable in a direction intersecting the fastening direction of the first connector 100 and the second connector 200. The slider 400 may include side plates 410 and a connection plate 420 connecting the side plates 410. The side plates 410 may be provided as a pair and disposed on opposite sides of the second connector 200. The connection plate 420 may be provided to connect the pair of side plates 410, so that the slider 400 may have a so-called C-shaped cross-section. As a result, the slider 400 may be coupled to allow the outer surface of the second connector 200 to be received through an open portion of the slider 400, and may be slidably assembled with the second connector 200.

Each of the inner surfaces of the pair of side plates 410 may be provided with the mating guide protrusion 413, which may be configured to be inserted into the mating guide groove 330. If the slider 400 is assembled to the second connector 200 (e.g., before operation), the mating guide protrusion 413 may be positioned on a lower side of the mating guide groove 330, and an end portion of the side plate 410 may be positioned on the guide rail 220. A lower side of the slider 400 may be supported by the stopper 230 of the second connector 200.

To facilitate movement of the slider 400 in a direction intersecting with the direction of advancement and retraction of the CPA member 300, the slider 400 may include gripping portions 421 and 412. The gripping portions 421 and 412 may include the first gripping portion 421 formed on the connection plate 420 and the second gripping portion 412 formed on each of the side plates 410.

The first gripping portion 421 may be formed to protrude outwardly from the connecting plate 420.

The second gripping portion 412 may be formed to be recessed inwardly from each of the pair of side plates 410. This may allow a user to easily move the slider 400 by supporting a finger on the first gripping portion 421 or gripping with a finger inserted through the two second gripping portions 412.

The slider 400 may include an inner guide protrusion 414 configured to stably move the slider 400 from the second connector 200 and/or prevent the slider 400 from deviating from the second connector 200. The inner guide protrusion 414 may be formed on each of the inner surfaces of the pair of side plates 410. As shown in the drawings, the inner guide protrusions 414 may be provided at a position where the second gripping portion 412 is formed. Accordingly, a guide groove 240 may be formed in the second connector 200 to allow the inner guide protrusion 414 to be inserted. The guide groove 240 may be formed in the direction of movement of the slider 400.

If the mating guide protrusion 413, the second gripping portion 412, and the inner guide protrusion 414 are located on the inner surface of the side plate 410, the second gripping portion 412 and the inner guide protrusion 414 may be spaced apart from the mating guide protrusion 413 so as to not interfere with the motion of the mating guide protrusion 413 and the mating guide groove 330 (e.g., during operation of the slider 400).

Hereinafter, an operational state of the connector locking device 10 will be described.

The first connector 100 and the second connector 200 may be coupled to each other. The locking protrusion 320 of the CPA member 300 may be inserted into the first locking groove 211*b*, and the slider 400 may be disposed on the lower side of the second connector 200.

The slider 400 may be moved in the direction intersecting the fastening direction of the first connector 100 and the second connector 200. As the mating guide protrusion 413 moves along the inclined guide portion 333 of the mating guide groove 330, the CPA member 300 may be guided to advance or retract in the direction intersecting the advancement and retraction direction of the slider 400. In other words, the slider 400 may be advanced to enter the inside of the guide hole 210. As a result, the slider 400 may be stably guided by the guide rail 200 and the guide groove 240 without deviating from the second connector 200.

If the CPA member 300 enters the guide hole 210 (e.g., in response to the action of the slider 400), the locking protrusion 320 may be elastically deformed inwardly by the second locking protrusion 212*a*, then may be elastically restored if positioned in the second locking groove 212*b*, for example, elastically restores so as be inserted into the second locking groove 212*b* to be fastened. Accordingly, the CPA member 300 may be restricted in its movement to maintain the locked state by the locking protrusion 320. Keeping the CPA member 300 locked may prevent the slider 400 from moving downwardly (e.g., by gravity) and may be hold the slider 400 in the fastened position.

If the fastened state is released, as the user grips the slider 400 and moves the slider 400 downwardly (e.g., while/by pressing the slider 400), the CPA member 300 may be moved by the mating guide protrusion 413 and retract from the guide hole 210. The slider 400 may be supported by the stopper 230 formed on the second connector 200, and may be limited in its moving distance.

As described above, the connector locking device 10 may allow the slider 400 to be advanced or retracted in the direction intersecting the CPA member 300, so that the CPA member 300 may be fastened or unfastened. As a result, the fastening workability may be improved. In addition, the fastened state of the CPA member 300 may be identified via the slider 400 even though the CPA member 300 is not visible to the naked eye. As a result, the problem of disconnection of the connector due to non-fastening of the CPA member 300 may be addressed.

As is apparent from the above, according to one or more features of the present disclosure, the fastening workability may be improved by fastening the CPA member through the slider although the CPA member is not visible to the naked eye.

Further, according to one or more features of the present disclosure, the fastened state of the CPA member may be identified through the slider, and may be easily released upon release.

Although various embodiment(s) of the disclosure have been shown and described, it would be appreciated by those having ordinary skill in the art that changes may be made in the embodiment(s) described herein without departing from the principles and spirit of the disclosure, the scope of which is defined in the claims and their equivalents.

What is claimed is:

1. A connector locking device, comprising:
a first connector;
a second connector coupled to the first connector, wherein the second connector comprises a guide hole having a locking protrusion and a locking groove on an outer side of the guide hole;
a connector position assurance (CPA) member configured to be fastened to the locking groove while moving along the guide hole and configured to prevent the first connector and the second connector from being decoupled; and
a slider mounted on the second connector to advance or retract in a direction intersecting a fastening direction of the first connector and the second connector, wherein the slider comprises a mating guide protrusion,
wherein the CPA member comprises a mating guide groove configured to accommodate the mating guide protrusion such that the mating guide protrusion is inserted and movable in the mating guide groove, and
the CPA member is configured to be guided to advance or retract in a direction intersecting the advancement or retraction of the slider.

2. The connector locking device of claim 1, wherein the CPA member comprises:
a body portion inserted into the guide hole to be movable,
a locking protrusion protruding from the body portion and provided to be elastically deformable, and
the mating guide groove formed in the body portion.

3. The connector locking device of claim 1, wherein the mating guide groove comprises an inclined guide portion configured to guide the mating guide protrusion to allow the CPA member to enter the guide hole when the slider is fastened.

4. The connector locking device of claim 1, wherein the slider is configured to be movable in a direction intersecting a moving direction of the CPA member, and
the slider further comprises:
a pair of side plates, wherein the mating guide protrusion inserted into the mating guide groove is provided on inner surfaces of the pair of side plates, and
a connection plate connecting the pair of side plates.

5. The connector locking device of claim 4, wherein the connection plate comprises a first gripping portion protruding outwardly.

6. The connector locking device of claim 4, wherein at least one of the pair of side plates comprises a second gripping portion recessed inwardly.

7. The connector locking device of claim 1, wherein:

the second connector comprises a guide groove formed along a moving direction of the slider, and the slider comprises an inner guide protrusion inserted into the guide groove.

8. The connector locking device of claim 4, wherein the second connector comprises a guide rail that supports and guides an end portion of the side plates.

9. The connector locking device of claim 1, wherein the second connector comprises a stopper that prevents the slider from deviating and limits a movement distance.

* * * * *